United States Patent [19]

Watanabe

[11] Patent Number: 4,748,877
[45] Date of Patent: Jun. 7, 1988

[54] SUPPLY APPARATUS FOR SUPPLYING A SCREW OR A SIMILAR ARTICLE

[75] Inventor: Choji Watanabe, Tokyo, Japan

[73] Assignee: Sony Corporation, Tokyo, Japan

[21] Appl. No.: 878,252

[22] Filed: Jun. 25, 1986

[30] Foreign Application Priority Data

Aug. 28, 1985 [JP] Japan ............................ 60-131056[U]

[51] Int. Cl.⁴ ............................................. B25B 23/06
[52] U.S. Cl. .......................................... 81/433; 81/435;
221/180; 221/168
[58] Field of Search ....................... 81/57.37, 430–433,
81/435; 221/165, 168, 162, 180; 414/288;
222/564, 547; 51/215 MH

[56] References Cited

U.S. PATENT DOCUMENTS

| | | | |
|---|---|---|---|
| 1,888,851 | 11/1932 | Donovan et al. | ............... 221/180 |
| 2,109,450 | 3/1938 | Schlayer et al. | .............. 51/215 MH |
| 2,621,824 | 12/1952 | Gookin | ................................. 221/168 |
| 2,770,269 | 11/1956 | Austin | .................................... 81/433 |

OTHER PUBLICATIONS

Japanese Utility Model Disclosure, No. 57-91575, 5/1982.

Primary Examiner—Debra Meislin
Attorney, Agent, or Firm—Hill, Van Santen, Steadman & Simpson

[57] ABSTRACT

A supply apparatus for supplying a screw, a rivet, or the like includes a chute in which one edge portion of an upper opening of a guide slit formed therein is located inside a stock section or thereabove, so that screws in an abnormal position can be removed by a brush member not on the upper surface of an oscillating dipper but on the upper surface of the chute. A timing between oscillation of the dipper and movement of the brush member need not be controlled. Screws of abnormal position can be removed with a simple mechanism so as to supply only those of normal position to a predetermined position, and to reliably return removed screws of abnormal position into the stock section.

4 Claims, 9 Drawing Sheets

SUPPLY APPARATUS FOR SUPPLYING A SCREW OR A SIMILAR ARTICLE

BACKGROUND OF THE INVENTION

1. Field of the Invention

The present invention relates to a supply apparatus for supplying a screw or a similar article having a shaft and a head portion, whose diameter is larger than the shaft portion (e.g., screw, rivet, or the like, to be referred to as a screw hereinafter), to a predetermined position and, more particularly, to a screw supply apparatus having a dipper for dipping up screws and a chute for supplying the dipped screws to a predetermined position.

2. Description of the Prior Art

In a screw supply apparatus disclosed in Japanese Utility Model Disclosure No. 57-91575, a dipper, having an upper surface on which a guide slit for receiving a shaft of a screw is open, is oscillatingly arranged in a screw stock section and is coupled to a chute, having an upper surface on which a guide slit is open, thereby supplying screws to a predetermined screw supply section. In this apparatus, screws in an abnormal position on the upper surface of the dipper are removed using a brush member so that only screws in a normal position, that is where the shaft is inserted in the guide slit on the upper surface of the chute and the head portion is engaged with a side edge portion of the upper opening of this slit, are smoothly supplied to the predetermined screw supply section. In the abnormal-position screw-removing mechanism disclosed in this disclosure, the brush member is arranged obliquely upward of the dipper, and when the dipper dips up screws and the upper surface of the dipper becomes horizontal, the brush member is pushed forward by an air cylinder at a proper timing so as to remove the screws of abnormal position.

With this mechanism, however, when the upper surface of the dipper becomes horizontal, oscillating movement of the dipper is temporarily interrupted and, at the same time, the brush member is moved forward, thus requiring accurate timing control. Therefore, a plurality of air cylinders and air pipes are necessary, resulting in a complicated and bulky apparatus. In addition, a dipping operation of the dipper cannot be performed quickly.

SUMMARY OF THE INVENTION

It is therefore an object of the present invention to provide a screw supply apparatus which can easily, reliably and quickly supply only screws in the normal position, shafts of which are inserted in a guide slit open to an upper surface of a chute and head portions of which are engaged with a side edge portion of the upper opening of this slit, to a predetermined position.

It is another object of the present invention to provide a screw supply apparatus which is compact, and which can reliably return screws in an abnormal position to a screw stock section.

It is still another object of the present invention to provide a screw supply apparatus which can maintain a proper number of screws near a dipper in a stock section, and charge a large amount of screws into the stock section.

It is still another object of the present invention to provide a screw supply apparatus which can easily control timing between oscillating movement of a dipper and a removing operation of screws in an abnormal position using a brush member, regardless of the compactness of the apparatus.

It is still another object of the present invention to provide a screw supply apparatus which can easily and reliably perform a pickup operation for each screw, which is guided to a predetermined position by a guide slit of a chute, using a simple mechanism.

It is still another object of the present invention to provide a screw supply apparatus which allows easy alignment of a screwdriver bit with a head portion of a screw, and in which a screw can be quickly and reliably picked up, thus improving efficiency of a screw pickup operation.

The above, and other objects, features and advantages of the invention will be apparent from the following detailed description which is to be read in conjunction with the accompanying drawings.

DESCRIPTION OF THE PREFERRED EMBODIMENT

Figure 1:
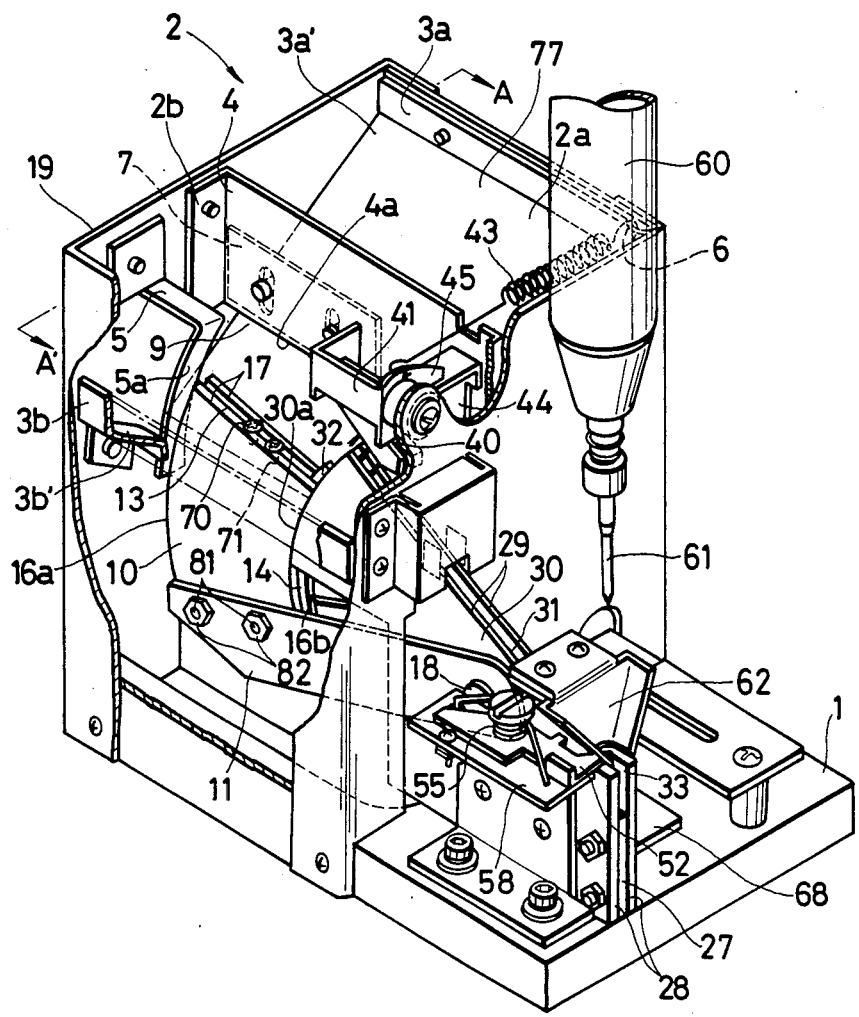
FIG. 1 is a perspective view of a screw supply apparatus according to an embodiment of the present invention.
Figure 2:
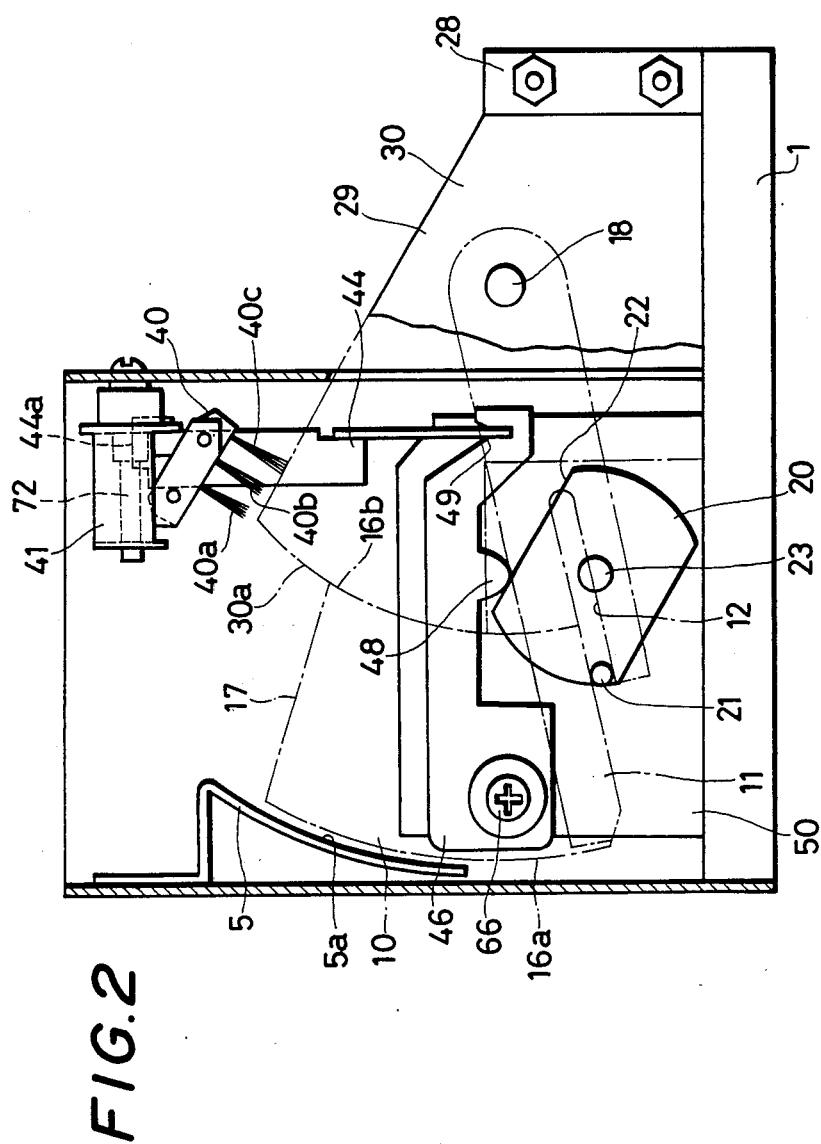
FIG. 2 is a cross-sectional view of a main part of a drive mechanism of the apparatus shown in FIG. 1.
Figure 4:
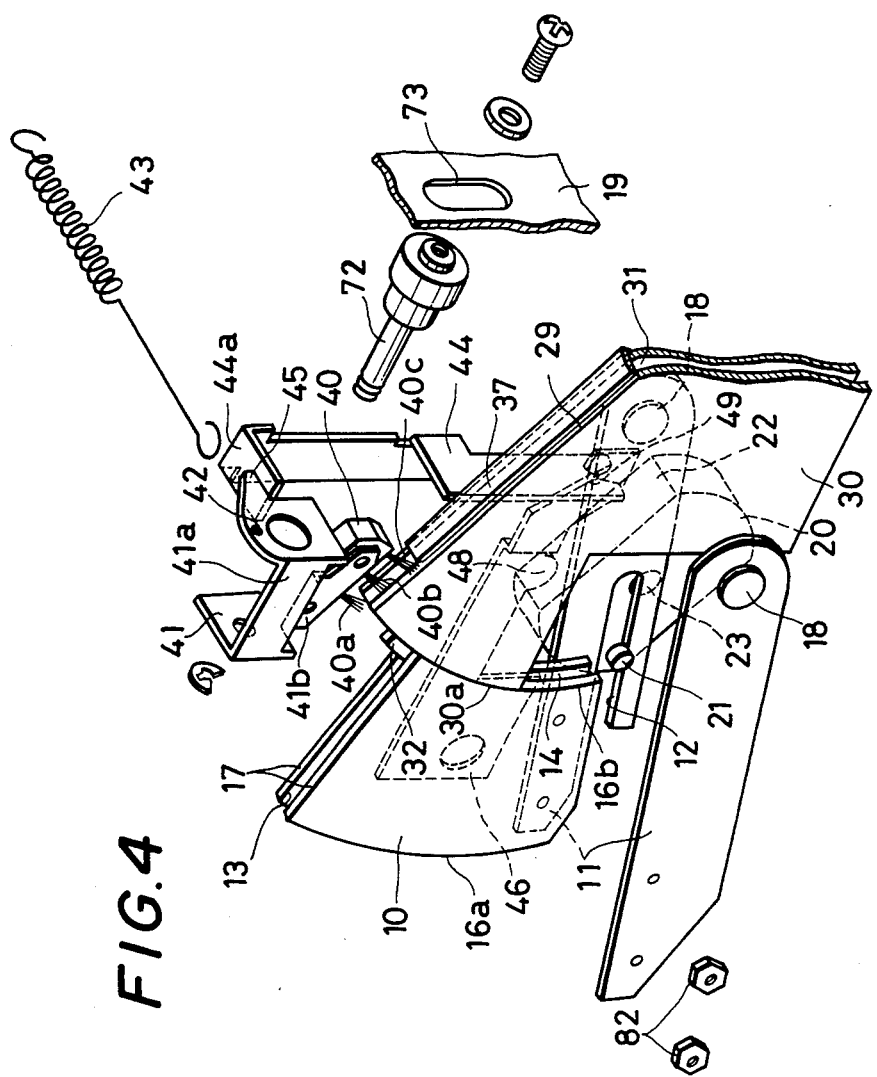
FIG. 4 is a partially cutaway, exploded perspective view of the drive mechanism shown in FIG. 2.

As shown in FIG. 1, a frame 19, which has a substantially rectangular parallelepiped shape and upper and lower openings, extends from an upper portion of a base 1. A dipper 10 for dipping up screws is arranged in a lower portion of the frame 19 to vertically oscillate. Note that the dipper 10 comprises of a pair of guide plates 17 facing through a spacer (not shown) to form, therebetween, a guide slit having a width slightly larger than a diameter of a shaft of each screw 70 to be supplied, and a pair of arms 11 whose distal end portions are overlaid on outer side surfaces of the lower portions of the guide plates 17. The guide plates 17, the arms 11 and the spacer are integrally coupled with each other by a bolt 81 and nut 82. Proximal ends of the arms 11 are axially supported by a chute 30 to be pivotal about a shaft 18, thereby vertically oscillating the dipper 10. Each guide plate 17 has a substantially trapezoidal shape, and two side edge portions 16a and 16b corresponding to upper and lower sides of a trapezoid are formed into an arc shape having the shaft 18 as the center. An engaging slit 12 for engaging an eccentric pin 21, which is eccentrically provided on the side surface of a rotating cam 20, is formed in one of the arms 11 as a part of the dipper 10 along the lengthwise direction of the arm 11 (FIGS. 2 and 4).

Figure 5A:
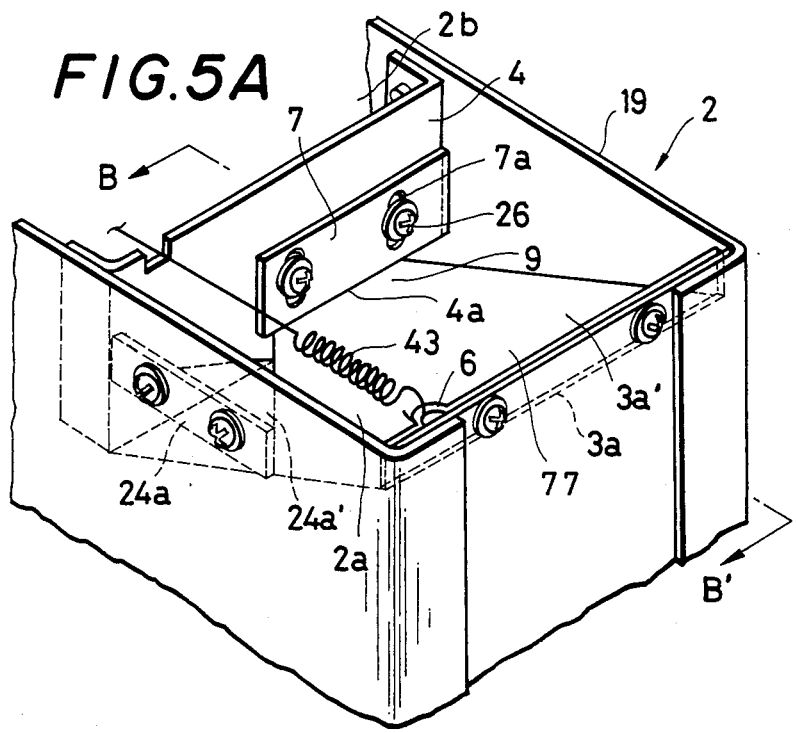
FIG. 5A is a partially cutaway perspective view of a stock section of the apparatus shown in FIG. 1.
Figure 5B:
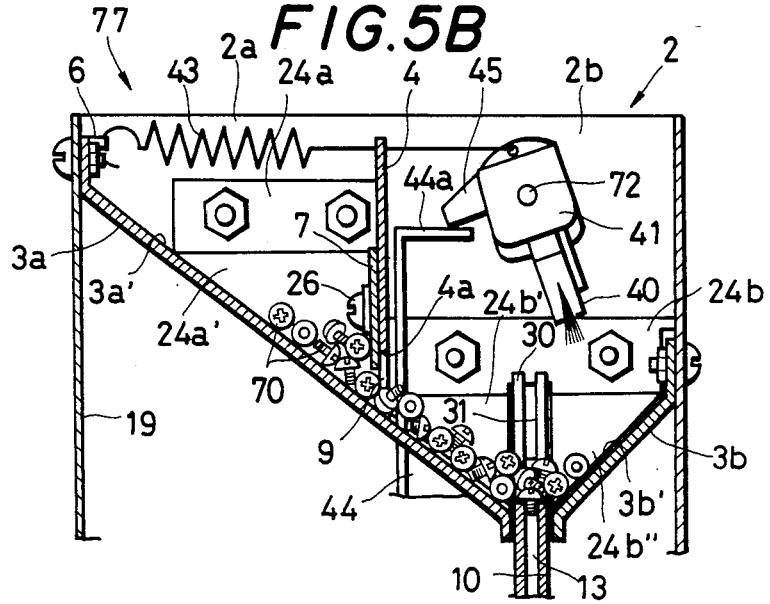
FIG. 5B is a sectional view taken along line B—B' in FIG. 5A.

A plurality of inclined plates 3a, 3b, 24a, and 24b are arranged in the frame 19. These inclined plates and the frame 19 constitute a stock section 2 for stocking screws 70. More specifically, a pair of main inclined plates 3a and 3b extend downward from front and rear walls of the frame 19 to the guide plates 17, respectively. Lower ends of inclined surfaces 3a' and 3b' formed by the plates 3a and 3b are arranged at a level equal to, or slightly higher or lower than the upper surfaces of the guide plates 17 at the lowermost position of the dipper 10, as shown in FIG. 5B.

A partition plate 4 is arranged at substantially the central position of the stock section 2 in its front-to-back direction, and extends to correspond with the total width of the section 2. Two side ends of the partition plate 4 are fixed to the frame 19 by screws. A notch 4a is formed in one-half of the lower portion of the partition plate 4. Therefore, the stock section 2 is divided by the partition plate 4 into a screw hopper chamber 2a without the dipper 10 and a dipping chamber 2b with the dipper 10. These chambers 2a and 2b communicate with each other through a communication opening 9 defined by the notch 4a. The communication opening 9 is formed at an offset position in the partition plate 4 so as to face the upper opening of a guide slit 13. As shown in FIGS. 5A and 5B, an interval adjusting plate 7 is mounted on the partition plate 4 at a position corresponding to the communication opening 9. This mounting is accomplished by screws 26, which are inserted in elongated holes 7a formed in one of the plates 7 and 4, and are screwed into the other one of the plates 7 and 4. After the screws are loosened, the interval adjusting plate 7 is moved vertically with respect to the partition plate 4, thereby adjusting an upper edge position of the communication opening 9 defined by the lower edge of the plate 7. As a result, a vertical dimension of the communication opening 9 can be adjusted.

The sub-inclined plate 24a having an inclined surface 24a' of a substantially right triangular shape is arranged in the screw hopper chamber 2a. The surface 24a' is inclined downward toward the communication opening 9. Therefore, the screws 70 stocked in the screw hopper chamber 2a are guided along the inclined surfaces 3a' and 24a' and are gathered toward the communication opening 9 by their weight. The fork-like sub-inclined plate 24b, having a pair of inclined surfaces 24b' and 24b" which have substantially right triangular shapes similar to the inclined surface 24a' and which are symmetrical with each other, is arranged in the dipping chamber 2b. These surfaces 24b' and 24b" are inclined downward toward the upper opening of the guide slit 13 when it moves to its lowermost position. Therefore, the screws 70 stocked in the dipping chamber 2b, and those introduced from the screw hopper chamber 2a into the dipping chamber 2b through the communication opening 9, are guided by the inclined surfaces 3a', 3b', 24b', and 24b", and are gathered toward the upper opening of the guide slit 13 by their weight.

A screw drop-guard member 5, having a curved surface of a shape corresponding to the side edge portion 16a of the guide plate 17, is arranged to face a side end face of the dipper 10 opposite the shaft 18. The screw drop-guard member 5 comprises a plate-like member of a width equal to or slightly larger than the total thickness of the guide plates 17 and the space between them, and is mounted on the frame 19. Note that the screw drop-guard member 5 prevents the screws 70 from being dropped from the guide slit 13 on the upper surface of the dipper 10. In addition, since the member 5 has a relatively narrow width, it does not adversely influence the capacity of the dipping chamber 2b.

The chute 30 is arranged on the base 1 adjacent to the leading ends of the guide plates 17 of the dipper 10. A rear half of the chute 30 is arranged inside the stock section 2, and the front half thereof is arranged outside the section 2. A side edge portion 30a of the chute 30 adjacent to the guide plate 17 has an arcuate shape corresponding to the side edge portion 16b of the guide plate 17, so that the side edge portion 16b slides along the side edge portion 30a during oscillating movement of the dipper 10. The chute 30 includes a pair of flat guide plates 29 similar to the guide plates 17, and has a guide slit 31, similar to the guide slit 13, between the guide plates 29. A dipper guide 32 is arranged between the guide plates 29, and a distal end portion of the dipper guide 32 projects from the side edge portion 30a of the chute 30 to be slidably engaged with the guide slit 13. Therefore, the dipper guide 32 serves to guide the oscillating movement of the dipper 10.

The upper surface of the chute 30 is inclined downward from its rear end (adjacent to the guide plate 17) to its front end. When the dipper 10 is at its uppermost position, the upper surfaces of the dipper 10 and chute 30 form a substantially continuous inclined surface (in the drawings, they are indicated by a substantially straight line). Therefore, in this state, the upper openings of the guide slits 13 and 31 form a substantially continuous groove. A pair of holding plates 28, which are relatively thicker than the guide plates 29, are arranged adjacent to the guide plates 29. Since these holding plates 28 and the guide plates 29 have the spacer 27 in common, the holding plates 28 are coupled to the guide plates 29 by the spacer 27, and the guide slit 31 thus extends to the front end of the holding plates 28.

A brush member 40 for removing screws in an abnormal position (e.g., a screw turned sideways) on the upper surface of the chute 30 is arranged above the rear end of the upper surface of the chute 30. The brush member 40 is mounted on a brush mounting portion 41b of a brush mounting plate 41, which consists of a substantially U-shaped supporting portion 41a and the brush mounting portion 41b extending downward from the portion 41a, as shown in FIG. 4. The brush mounting plate 41 is axially supported at the supporting portion 41a thereof by a shaft 72 on the frame 19, so as to oscillate in a direction substantially perpendicular to the upper opening of the guide slit 31. The shaft 72, axially supporting the brush mounting plate 41, is fixed by a screw inserted in a vertically elongated hole 73 formed in the part of the frame 19 constituting the stock section 2. Therefore, when a position of the screw within the elongated hole 73 is adjusted, the brush mounting plate 41 can be vertically moved to adjust a height of the brush member 40. A mounting hole 42 is formed in the brush mounting plate 41, and a biasing means (e.g., a coil spring) 43 is engaged between the mounting hole 42 and a mounting portion 6 formed on the side wall of the stock section 2. Thus, the brush mounting plate 41 is always biased counterclockwise (FIG. 3) around the shaft 72. Therefore, when an arm 44 is at its lowermost position, the brush mounting plate 41 abuts its projection 45 against an actuating portion 44a of the arm 44, and the brush member 40 is inclined in a direction opposite the coil spring 43, as indicated by a solid line in FIG. 3. The brush member 40 comprises three brushes 40a, 40b, 40c, among which the lowermost brush 40c is slightly longer than the remaining two brushes 40a and 40b in order to come close to the guide slit 31. The brush member 40 is fixed to the brush mounting portion 41b of the brush mounting plate 41, so that distal ends of the brushes 40a to 40c face the upper opening of the guide slit 31 when the brush member 40 pivots to direct downward.

Figure 6A:
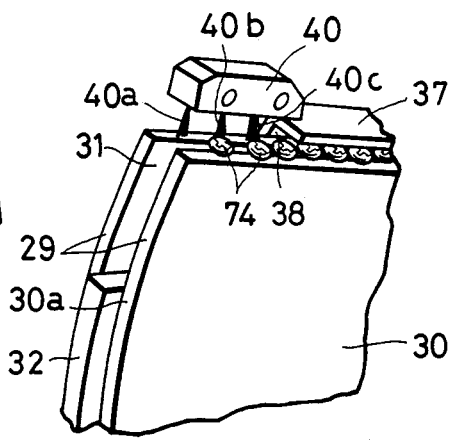
FIGS. 6A, 6B and 6C are partial, enlarged views of different states of an upper surface portion of a chute of the apparatus shown in FIG. 1.
Figure 6B:
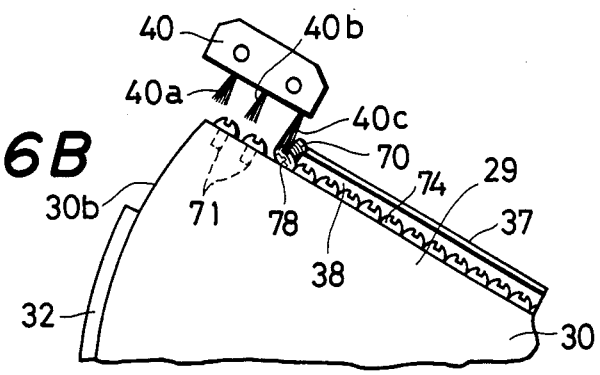
Figure 6C:
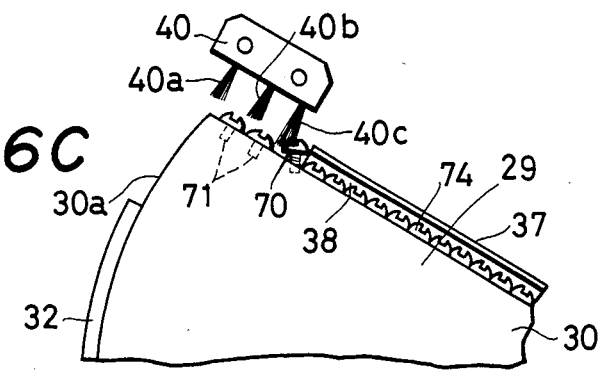

A cover member 37 is arranged on the upper surface of the chute 30, excluding its rear end portion, as shown in FIGS. 6A to 6C (although omitted from FIG. 1). A screw passage gap 38 having a height slightly larger than that of a head portion 74 of the screw 70 is formed between the cover member 37 and the upper surface of the chute 30. Note that the cover member 37 has a substantially inverted L-shaped cross-section, so that a horizontal portion thereof covers the upper surface of the chute 30 and a vertical portion thereof is supported in a cantilever manner by a side surface of the chute 30.

Figure 3:
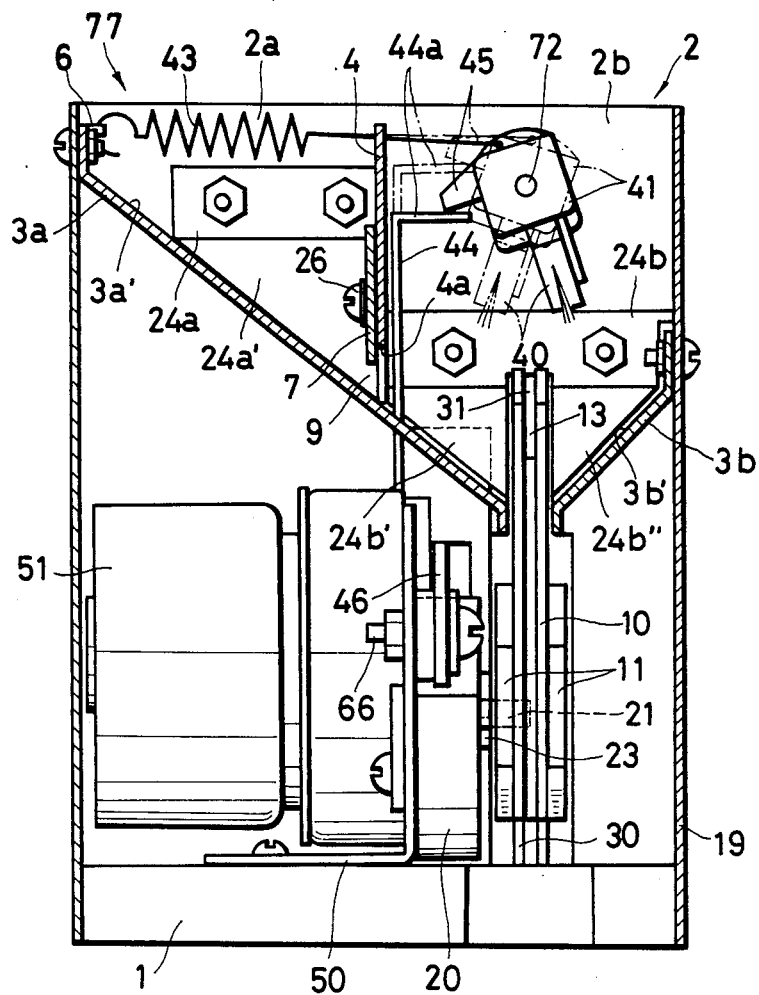
FIG. 3 is a sectional view taken along line A—A' in FIG. 1.

A drive motor 51 is arranged in the frame 19 below the inclined plate 3a of the stock section 2, as shown in FIG. 3. The motor 51 is fixed by screws to an L-shaped mounting plate 50, which is fixed to the base 1 by screws. The rotating cam 20 is fixed to a rotating shaft 23 of the motor 51. The rotating cam 20 has a shape where a pair of opposing arcs are cut from a circle by a pair of chords, which are parallel to each other and have of substantially the same length. Thus, the cam 20 has a cam surface consisting of a pair of opposing chord portions and a pair of opposing arc portions on its outer peripheral surface. A tracer portion 48 projecting downward from an intermediate portion of a tracer member 46 abuts against the cam surface. One end of the tracer member 46 is axially supported by the L-shaped mounting plate 50 to be pivotal about a shaft 66. An engaging notch 49 is formed in the other end of the tracer member 46, and is engaged with a V-shaped notch formed at lower end of the arm 44. Note that since the brush mounting plate 41 is biased counterclockwise (FIG. 3) around the shaft 72 by the coil spring 43, the projection 45 of the plate 41 elastically pushes up the actuating portion 44a of the arm 44. For this reason, since the arm 44 elastically pushes the tracer member 46 clockwise (FIG. 2) around the shaft 66, the tracer portion 48 is always in contact with the cam surface of the rotating cam 20. Therefore, when the tracer portion 48 moves along the pair of arc portions of the cam surface of the rotating cam 20, the tracer member 46 keeps stationary. When the tracer portion 48 moves along the pair of chord portions of the cam surface, the tracer member 46 reciprocates once (that is, it gradually moves downward and then moves upward) each time the tracer portion 48 moves along one of the pair of chord portions.

The eccentric pin 21 projects from the side surface of the rotating cam 20, as previously described, and is engaged with the engaging slit 12 formed in the arm 11 of the dipper 10. Therefore, the dipper 10 reciprocates once around the shaft 18 upon a single rotation of the rotating cam 20.

Figure 7:
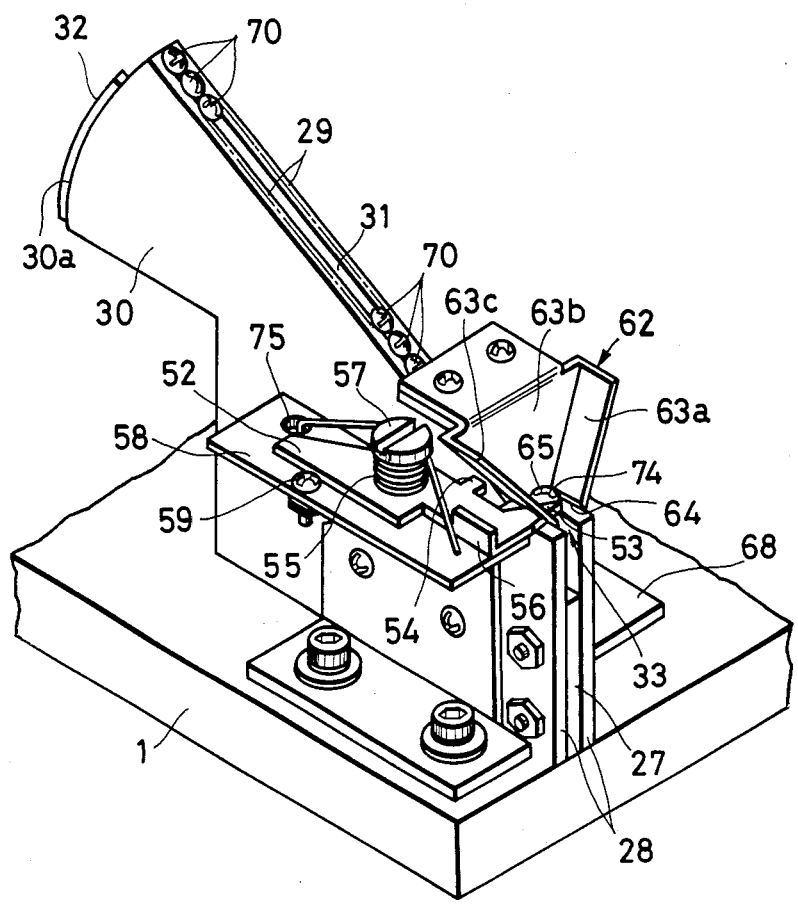
FIG. 7 is a perspective view of a main part showing the positional relationship among the chute, a stopper, and a bit guide in the apparatus shown in FIG. 1.
Figure 8:
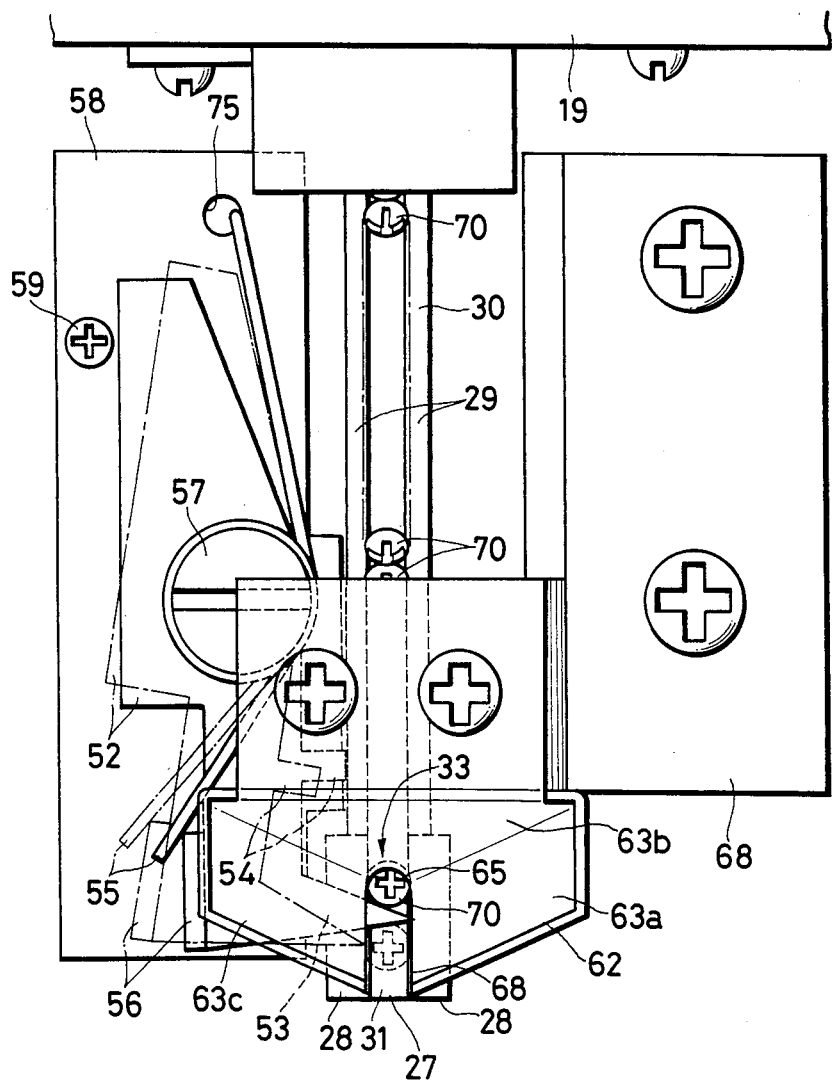
FIG. 8 is a plan view of the main part shown in FIG. 7.

An engaging member 52 is arranged near a screw supply section 33 at the front end of the upper surface of the chute 30, as shown in FIGS. 1, 7, and 8. This engaging member 52 is mounted on a substantially U-shaped table 58, which is fixed by screws to the base 1 to be adjacent to the chute 30, so as to be pivotal around a shaft 57. The engaging member 52 is biased counterclockwise (FIG. 8) around the shaft 57 by a biasing means (e.g., a coil spring) 55. More specifically, an intermediate portion of the coil spring 55 is wound around the shaft 57, one end thereof is inserted in a hole 75 formed in the table 58, and the other end thereof is engaged with a projection 56 formed on the engaging member 52. For this reason, the coil spring 55 biases the engaging member 52 counterclockwise (FIG. 8) around the shaft 57.

A V-shaped engaging portion 53 extending in a direction substantially perpendicular to the longitudinal direction of the engaging member 52 is formed in one end of the engaging member 52. The engaging portion 53 causes the head portion 74 of the screw 70, which is guided along the upper opening of the guide slit 31 on the upper surface of the chute 30, to stop at the screw supply section 33. A stopper portion 54 is formed on the engaging member 52 to be adjacent to the engaging portion 53. The stopper portion 54 abuts against the side wall surface of the chute 30 to regulate a reverse pivoting position of the engaging member 52.

A bit guide 62 is arranged above the engaging portion 53 of the engaging member 52. The bit guide 62 has three inclined surfaces 63a, 63b, and 63c which are inclined and open upward from the head portion 74 of the frontmost screw 70 stopped by the engaging member 52, as shown in FIGS. 7 and 8. These inclined surfaces enclose three sides (i.e., rear, left, and right sides), but not the front side of the screw supply section 33. The lower ends of these inclined surfaces define a U-shaped notch 64 having substantially the same width as a diameter of the head portion 74 of the screw 70. The bit guide 62 is mounted on the base 1 by a mounting plate 68 or the like, so that a curved portion 65 of the U-shaped notch 64 formed in the lower end of the bit guide 62 is positioned above the head portion 74 of the frontmost screw 70 stopped by the engaging member 52.

The operation of the apparatus of this embodiment will now be described.

In FIGS. 1, 5A, and 5B, the screws 70 are charged into the screw hopper chamber 2a of the stock section 2 from an upper opening 77 thereof, and are then moved along the inclined surfaces 3a' and 24a', formed by the inclined plates 3a and 24a, toward the communication opening 9 below the partition plate 4 by their weight. An interval between the partition plate 4 and the inclined surface 3a' in the communication opening 9 is adjusted by the interval adjusting plate 7 depending on the size or type of screw to be supplied, so that the screws 70 are gradually moved toward the dipper 10 below the stock section 2. Therefore, the charged screws 70 reach the hopper chamber 2b while their movement is being regulated by the interval adjusting plate 7, as shown in FIG. 5B, and are then supplied to the upper opening of the guide slit 13 of the dipper 10. In this way, a number of screws 70 can be held near the upper surface of the dipper 10. The number of the screws 70 in the dipping chamber 2b is mainly determined by the upper edge position of the communication opening 9, and the upper level of a lot of screws 70 (corresponding to a water line) is therefore equal to or slightly lower than this upper edge position. Therefore, the interval adjusting plate 7 is moved vertically in accordance with the size or type of screw to be supplied, so that the upper level of screws 70 is positioned at an intermediate position between uppermost and lowermost positions of the upper surface of the dipper 10.

When the cam 20 is rotated by the motor 51, the eccentric pin 21, engaged with the engaging slit 12 formed in the arm 11 of the dipper 10, slides within the slit 12 and oscillates the dipper 10 vertically. Upon movement of the dipper 10, the screws 70, whose shafts 71 are inserted in the guide slit 13 of the dipper 10, are dipped up by the dipper 10. When the arm 44 is pushed upward by the tracer member 46 upon rotation of the cam 20, the actuating portion 44a of the arm 44 pushes the projection 45 of the brush mounting plate 41 against the biasing force of the coil spring 43. Therefore, the brush member 40, inclined at a position indicated by the solid line in FIG. 3, pivots forward around the shaft 72, to a position indicated by an imaginary line in FIG. 3, and then pivots backward to the solid-line position upon downward movement of the arm 44. As a result, the brush member 40 swings in a direction perpendicular to the upper opening of the guide slit 31 of the chute 30. During single rotation of the cam 20, the dipper 10 reciprocates once vertically, and the brush member 40 swings twice.

Since the brushes 40a to 40c of the brush member 40 are set at positions at which their distal ends just contact with the head portion 74 of the screw of normal position, whose shaft is normally inserted in the guide slit 31 of the chute 30, as shown in FIGS. 6A to 6C, only screws 78 in an abnormal position on the upper surface of the chute 30 are removed thereby. Since the brush 40c at the position nearest the gap 38 formed in the upper portion of the chute 30 is slightly longer than the brushes 40a and 40b, it serves to push into the gap 38 a screw caught by the cover member 37 at an entrance of the gap 38, as shown in FIG. 6C.

When the upper surface of the dipper 10 is aligned with that of the chute 30 and the upper openings of the slits 13 and 31 thereof communicate with each other, the screws 70 dipped up by the dipper 10 slide downward along the chute 30 by their weight while their shaft portions 71 are inserted into the slit 31, and are supplied to the screw supply section 33 through the gap 38 formed in the upper portion of the chute 30. When the screws are supplied from the dipper 10 to the chute 30, the brush member 40 is away from the upper surface of the chute 30 so as not to interrupt the flow of the screws. The screws 78 in an abnormal position (e.g., screws turned sideways) on the upper surface of the chute 30 are removed by the brush member 40. Even if there is a screw in an abnormal position supplied onto the chute 30 without being removed by the brush member 40, such a screw is stopped at the entrance of the gap 38, as shown in FIG. 6B. Therefore, this abnormally positioned screw can be reliably removed by the brush member 40 after it is stopped. After the screw 78 in an abnormal position is removed by the brush member 40, the subsequent screws in a normal position are supplied to the screw supply section 33 through the gap 38.

Figure 9A:
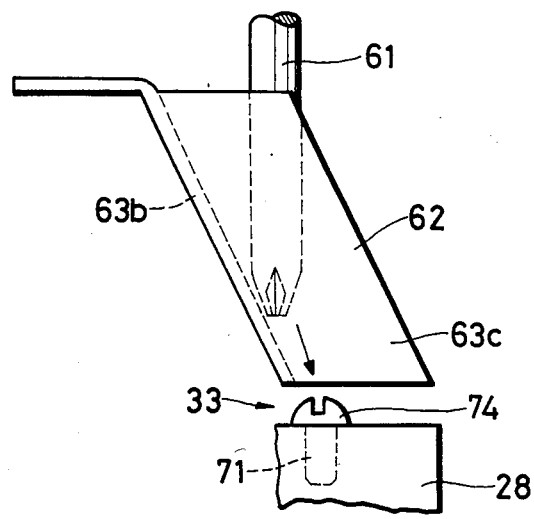
FIG. 9A is a side view of a bit guide section shown in FIG. 8.
Figure 9B:
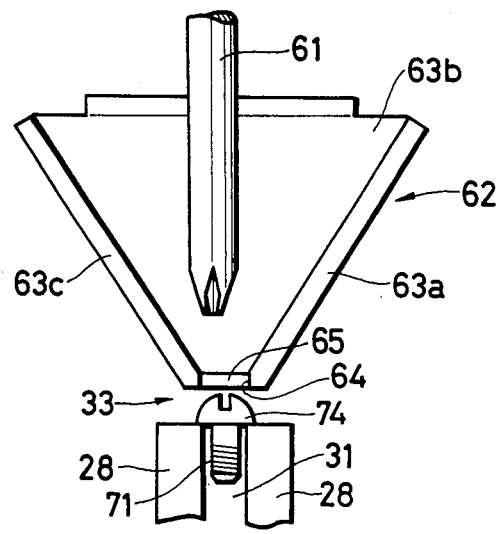
FIG. 9B is a front view of the bit guide section shown in FIG. 8.

The screw which has slid down along the chute 30 is engaged with and stopped by the engaging portion 53 of the engaging member 52 at the head portion 74 thereof, as shown in FIGS. 7 and 8. Therefore, when a bit 61 of a magnet screwdriver 60 is moved downward along the inclined surface 63b, 63a, or 63c of the bit guide 62, as shown in FIGS. 9A and 9B, the distal end of the bit 61 automatically abuts against the head portion 74 of the screw, and becomes attached thereto by its attraction force. In this state, when the bit 61 is pulled forward along the U-shaped notch 64, since the head portion 74 of the screw 70 pushes the engaging member 52, the engaging member 52 pivots clockwise (FIG. 8) around the shaft 57 from a solid-line position to a dotted-line position. As a result, the screw 70 is drawn out from the screw supply section 33. Note that after the screw 70 is drawn out, the engaging member 52 quickly returns to the solid-line position in FIG. 8 by the biasing force of the coil spring 55, thereby preventing unnecessary supply of the following screws. In this case, since the stopper portion 54 formed on the engaging member 52 strikes the side wall surface of the chute 30 to apply an impact thereto, screw flow on the upper surface of the chute 30 can be smooth. Particularly, since small screws are light in weight, their flow is often interrupted on the chute 30. In such a case, it is effective to apply an impact to the chute 30. When the engaging member 52 returns to its original position, since the stopper portion 54 abuts the side wall surface of the chute 30, the engaging member 52 can be prevented from being excessively pivoted. Thus, the engaging portion 53 can be returned to a predetermined position on the chute 30.

Note that the screw supply apparatus described above is preferably used for supplying a small screw having a diameter of 1.4 to 1.7 mm and a length of 1.4 to 10 mm, but can be used for supplying a screw having a diameter smaller than 1.4 mm or larger than 1.7 mm and a length smaller than 1.4 mm or larger than 10 mm.

Although the invention has been described with respect to preferred embodiments, it is not to be so limited as changes and modifications can be made which are within the full intended scope of the invention as defined by the appended claims.

I claim as my invention:

1. A supply apparatus for supplying a screw or a similar article which comprises:

a stock section for stocking screws;

a dipper oscillatingly arranged to dip up the screws stocked in said stock section;

said dipper having an upper surface that defines spaced edge portions which define a first guide slit in said dipper, which slit is upwardly open to guide the screws, such that shafts of the screws are received therein and head portions thereof are engaged by the edge portions;

a chute for supplying the screws dipped up by said dipper to a predetermined position;

said chute having an upper surface that defines spaced edge portions which define a second guide slit which is open to the upper surface of said dipper, to guide the screws, such that shafts of the screws are received therein and head portions thereof are engaged by the edge portions of the chute;

the screws dipped up by said dipper being guided to said second guide slit by said first guide slit, and then guided to the predetermined position by said second guide slit;

wherein said chute is arranged so that one edge portion of said chute is located inside said stock section;

a brush means, which is oscillatingly arranged so as to remove screws in an abnormal position on the upper surface of said chute, said brush means is arranged to correspond with said edge portions of said chute; and further comprising:

a rotating cam which is rotated to oscillate said brush member and said dipper;

a tracer portion which oscillates along a cam surface of said rotating cam;

an engaging projection arranged on said rotating cam at an eccentric position; and an engaging slit which is formed in said dipper to be engaged with said engaging projection; and wherein said brush means is cooperatively associated with said tracer portion so that said brush means oscillates upon movement of said tracer portion, and said dipper is cooperatively associated with said engaging projection so that said dipper oscillates upon rotation of said engaging projection.

2. An apparatus according to claim 1, wherein said rotating cam has a shape where a pair of opposing arcs are cut from a circle by a pair of chords, which are parallel to each other and have substantially the same length, whereby it has a cam surface consisting of a pair of opposing chord portions and a pair of opposing arc portions on its outer peripheral surface.

3. A supply apparatus for supplying a screw or a similar article which comprises:

a stock section for stocking screws;

a dipper oscillatingly arranged to dip up the screws stocked in said stock section;

said dipper having an upper surface that defines spaced edge portions which define a first guide slit in said dipper, which slit is upwardly open to guide the screws, such that shafts of the screws are received therein and head portions thereof are engaged by the edge portions of the first;

a chute for supplying the screws dipped up by said dipper to a predetermined position;

said chute having an upper surface that defines spaced edge portions which define a second guide slit which is open to the upper surface of said dipper, to guide the screws, such that shafts of the screws are received therein and head portions thereof are engaged by the edge portions of the chute;

the screws dipped up by said dipper being guided to said second guide slit by said first guide slit, and then guided to the predetermined position by said second guide slit;

wherein said chute is arranged so that one edge portion of said chute is located inside said stock section;

a brush means, which is oscillatingly arranged so as to remove screws in an abnormal position on the upper surface of said chute, said brush means is arranged to correspond with said edge portions of said chute; further comprising:

an engaging member which is pivoted to stop the screws at the predetermined position;

a biasing means for biasing said engaging member in a backward pivoting direction thereof;

wherein when said engaging member is at its backward pivoting position, said engaging member abuts against the head portion of the screw guided along said second guide slit to stop the screw at the predetermined position, and when an attraction force is applied to the screw in the stop state to draw it from the predetermined position in an extending direction of said second guide slit, said engaging member is pivoted forward by the screw against the biasing force of said biasing means, so that the screw can be drawn out from the predetermined position in the extending direction of said second guide slit; and wherein a stopper portion for regulating the backward pivoting position of, said engaging member is formed on said engaging member, and when said engaging member pivots backward by the biasing force of said biasing means, said stopper portion abuts against a side wall surface of said chute so as to apply an impact to said chute, thereby smoothing flow of the screws on the upper surface of said chute, and regulating the backward pivoting position of said engaging member.

4. A supply apparatus for supplying a screw or a similar article which comprises:

a stock section for stocking screws;

a dipper oscillatingly arranged to dip up the screws stocked in said stock section;

said dipper having an upper surface that defines spaced edge portions which define a first guide slit in said dipper, which slit is upwardly open to guide the screws, such that shafts of the screws are received therein and head portions thereof are engaged by the edge portions;

a chute for supplying the screws dipped up by said dipper to a predetermined position;

said chute having an upper surface that defines spaced edge portions which define a second guide slit which is open to the upper surface of said dipper, to guide the screws, such that shafts of the screws are received therein and head portions thereof are engaged by the edge portions of the chute;

the screws dipped up by said dipper being guided to said second guide slit by said first guide slit, and then guided to the predetermined position by said second guide slit;

wherein said chute is arranged so that one edge portion of said chute is located inside said stock section;

a brush means, which is oscillatingly arranged so as to remove screws in an abnormal position on the upper surface of said chute, said brush means is arranged to correspond with said edge portions of said chute;

a bit guide having inclined surfaces which open upward from the predetermined position and surround three sides of the predetermined position; and wherein a bit, which is moved downward toward the predetermined position from a position obliquely above the predetermined position, is guided to the predetermined position; and said bit engaged with the screw is moved along the second guide slit from the remaining one side around the predetermined position, thereby drawing out the screw from the predetermined position; and further comprising a U-shaped notch defined by the lower edge of said inclined surfaces, wherein a curved portion of said U-shaped notch is arranged above the head portion of a frontmost screw stopped by said engaging member.

* * * * *